March 17, 1964

G. A. BOUDREAUX ETAL 3,125,165

ROTARY LAWN MOWER EDGING ATTACHMENT

Filed Dec. 20, 1961

Gene A. Boudreaux
John J. Aguillard
INVENTORS

March 17, 1964  G. A. BOUDREAUX ETAL  3,125,165
ROTARY LAWN MOWER EDGING ATTACHMENT
Filed Dec. 20, 1961  2 Sheets-Sheet 2
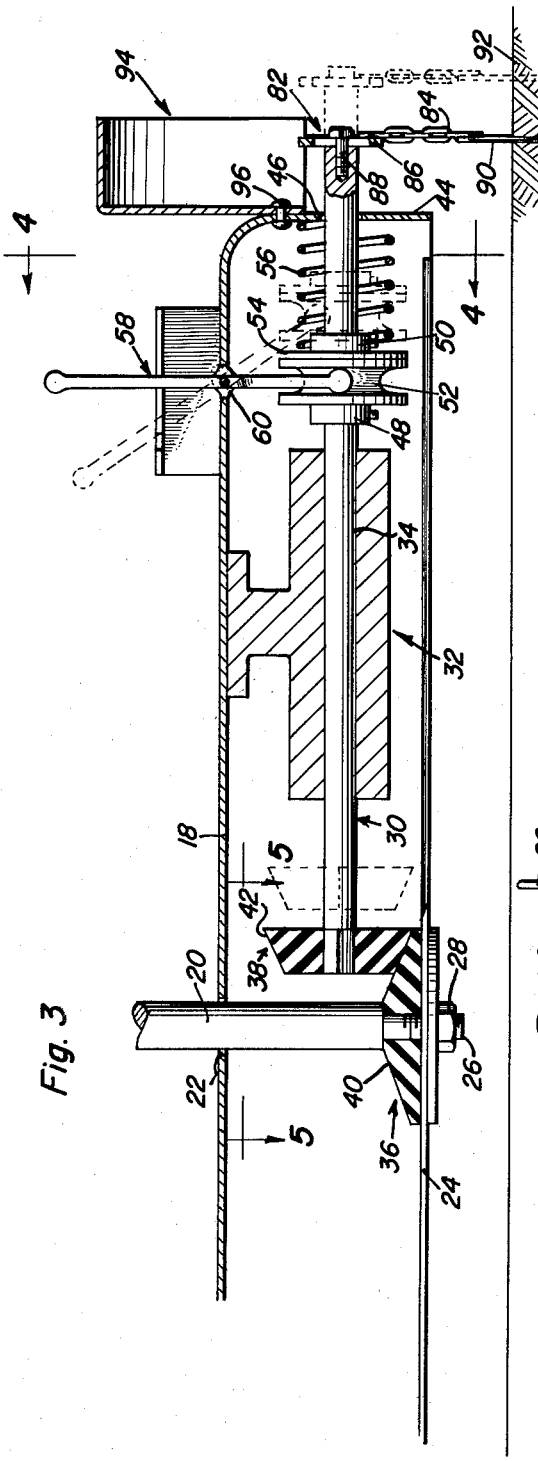
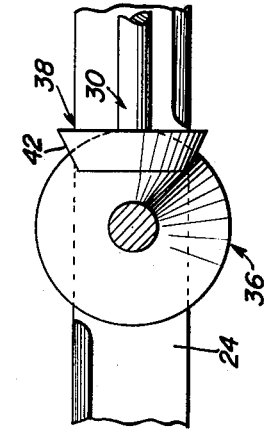
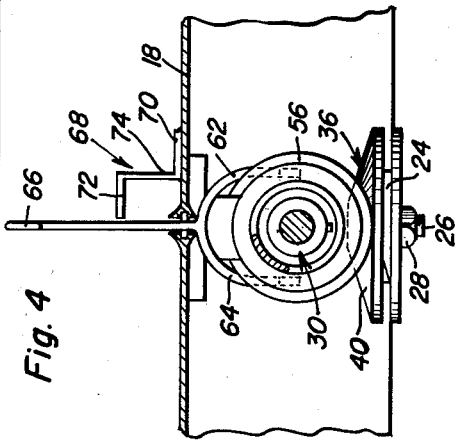
Gene A. Boudreaux
John J. Aguillard
INVENTORS

United States Patent Office 3,125,165
Patented Mar. 17, 1964

3,125,165
ROTARY LAWN MOWER EDGING ATTACHMENT
Gene A. Boudreaux, 118 St. Louis St., and John J. Aguillard, 7688 Maribel Court, both of Baton Rouge, La.
Filed Dec. 20, 1961, Ser. No. 160,822
4 Claims. (Cl. 172—14)

This invention relates to a novel and useful rotary lawn mower edging attachment and more specifically to a rotary edging attachment which may be conveniently mounted on existing types of rotary lawn mowers and utilized to trim and edge borders.

A rotary lawn mower edging attachment of the instant invention has been specifically designed for ease of attachment to existing rotary lawn mowers and includes a relatively simple but effective manner of drivingly connecting the edging attachment to the drive shaft of the rotary mower.

The main object of this invention is to provide an edging attachment for rotary lawn mowers which may be conveniently utilized to edge border areas while a lawn mower to which the edging attachment is being utilized to cut grass adjacent the border areas.

A further object of this invention, in accordance with the preceding object is to provide an edging attachment which may be readily secured to numerous types of existing rotary lawn mowers.

Still another object of this invention is to provide an edging attachment including a power take-off shaft and means for rotatably and slidably supporting the power take-off shaft from the motor supporting platform or guard of a rotary mower for rotation about and longitudinal shifting along a horizontally disposed axis extending generally radially of the axis of the rotation of the drive shaft of the rotary mower in order that coacting friction drive disks which are beveled may be attached to the adjacent ends of the power take-off shaft of the attachment and the drive shaft of the rotary mower and brought into driving engagement with each other for drivingly connecting the drive shaft to the power take-off shaft of the attachment.

A further object of this invention is to provide means normally resiliently urging the power take-off shaft in a direction for driving engagement or connection with the drive shaft of the rotary mower and also releasable latch means for releasably retaining the power output shaft of the attachment in an axially displaced position away from engagement with the drive shaft of the rotary mower.

A final object to be specifically enumerated herein is to provide an edging attachment for a rotary lawn mower in accordance with the preceding object which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged fragmentary vertical sectional view taken substantially upon a plane indicated by section line 3—3 of FIGURE 2;

FIGURE 4 is a fragmentary vertical sectional view taken substantially upon the plane indicated by section line 4—4 of FIGURE 3;

FIGURE 5 is a fragmentary horizontal sectional view taken substantially upon the plane indicated by section line 5—5 of FIGURE 3.

Figure 1:
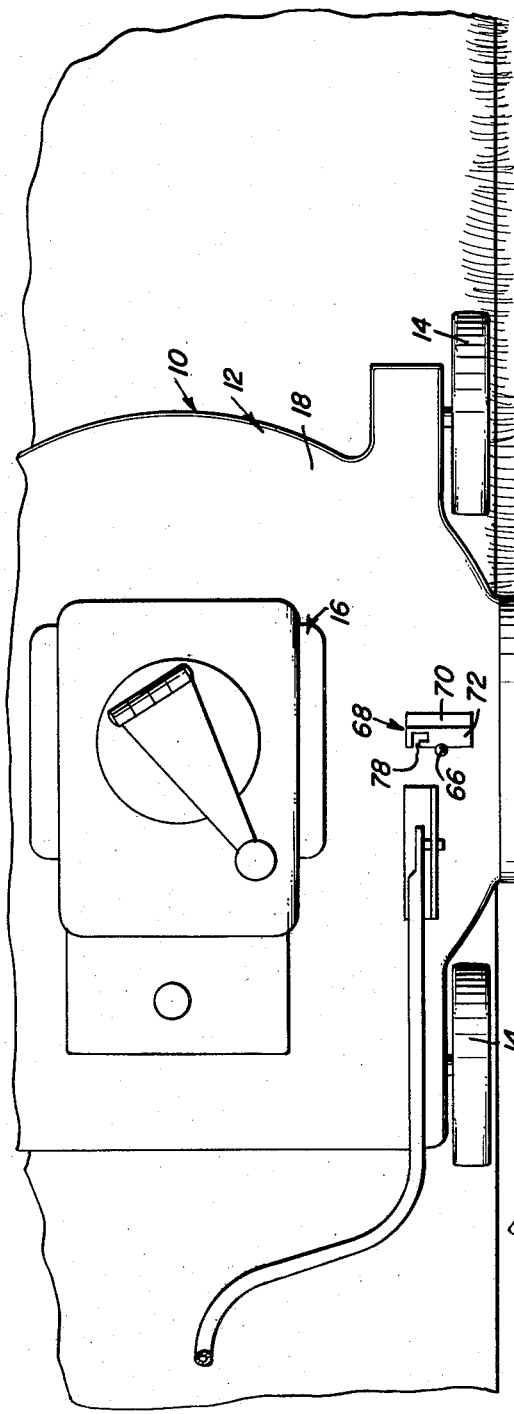
FIGURE 1 is a fragmentary top plan view of a conventional type of rotary lawn mower which has an edging attachment constructed in accordance with the present invention mounted thereon.

Referring now more specifically to the drawings the numeral 10 generally designates a rotary lawn mower which is of conventional design and includes a housing or platform generally referred to by reference numeral 12 from which ground engaging wheels 14 are rotatably journaled. An internal combustion engine generally referred to by the reference numeral 16 is rigidly mounted on the top plate 18 of the platform or housing 12 in any convenient manner and it may be observed from FIGURE 3 of the drawings that the internal combustion engine 16 includes a depending drive shaft 20 which extends downwardly through an opening 22 formed in the top plate 18 and has a rotary cutter blade 24 secured to its diametrically reduced and externally threaded lower portion 26 by means of a fastener 28.

With attention now directed more specifically to FIGURE 3 of the drawings there will be seen a power take-off shaft generally referred to by the reference numeral 30. A journal block assembly generally referred to by the reference numeral 32 and having a longitudinal bore 34 formed therethrough is supported in depending relation from the lower surface of the top plate 18 of the platform 12 in any convenient manner and it will be noted that the bore 34 rotatably and slidably receives the power take-off shaft 30.

First and second bevelled resilient drive wheels generally referred to by the reference numerals 36 and 38 are secured to the diametrically reduced end portion 26 and the adjacent end of the power take-off shaft 30 in any convenient manner. It will be noted that the bevelled surfaces 40 and 42 of the wheels 36 and 38 respectively are disposed in such a manner relative to each other that the wheel 38 may be brought into driving engagement with the wheel 36 upon axial shifting of the shaft 30 from the position illustrated in phantom lines in FIGURE 3 of the drawings to the limit position illustrated in solid lines in FIGURE 3. It will be noted that the side of the platform or housing 12 adjacent the end of the shaft 30 remote from the wheel 38 is provided with a depending flange 44 having an opening 46 formed therethrough through which the adjacent end of the shaft 30 projects.

A pair of stop collars 48 and 50 are secured in spaced relation on the shaft 30 between the journal block assembly 32 and the dependent flange 44 and a rotary shifting yoke disk 52 is mounted on the shaft 30 between the stop collars 48 and 50. A thrust washer 54 is also disposed on the shaft 30 and to the side of the yoke 52 adjacent the depending flange 44. A compression spring 56 is disposed between the confronting surfaces of the flange 44 and the thrust washer 54 and in this manner the yoke 52 is urged to the left as viewed in FIGURE 3 of the drawings whereby the wheel 38 is normally urged to the limit position shown in phantom lines in FIGURE 3 with the shaft 30 drivingly connected to the shaft 20.

An elongated shifting fork lever generally referred to by the reference numeral 58 is pivotally secured to the housing 12 at its mid-portion by means of pivot pin 60 for rotation about a generally horizontally disposed axis extending substantially at right angles to the longitudinal axis of the shaft 30 and the lower end of the fork lever 58 is bifurcated and embraces the yoke 52 between its furcations 62 and 64. The upper end of the shifting fork lever projects through the top plate 18 and is provided with a knob 66 at its upper terminal end portion. From FIGURE 4 of the drawings it may be seen that a generally Z-shaped latch assembly referred to in general by the reference numeral 68 is provided and includes a pair of generally horizontally disposed flanges 70 and 72 which are interconnected by means of an upstanding flange 74. From FIGURE 1 of the drawings it may be seen that the flange 72 includes an L-shaped slot 78 with which the upper end of the fork lever 58 may be engaged to retain the wheel 38 and yoke 52 in the position illustrated in phantom lines in FIGURE 3 of the drawings and against the yieldingly thrust of the compression spring 56.

A rotary edging member assembly generally referred to by the reference numeral 82 includes an elongated flexible member 84 which has one end secured to the outer end of the shaft 30 by means of an attaching ring or washer 86 which is secured to the end of the shaft 30 by means of a suitable fastener 88. The free end of the elongated flexible member 84 has a cutter member 90 secured thereto and upon rotation of the shaft 30 the cutter member 90 will be swung rapidly about the longitudinal axis of the shaft 30 and into engagement with the ground 92. It is of course to be understood that other types of rotary edging members may be utilized such as a solid cutter disk but that in most cases the cutter member 90 carried by the free end of the elongated flexible member 84 is desirable.

Figure 2:
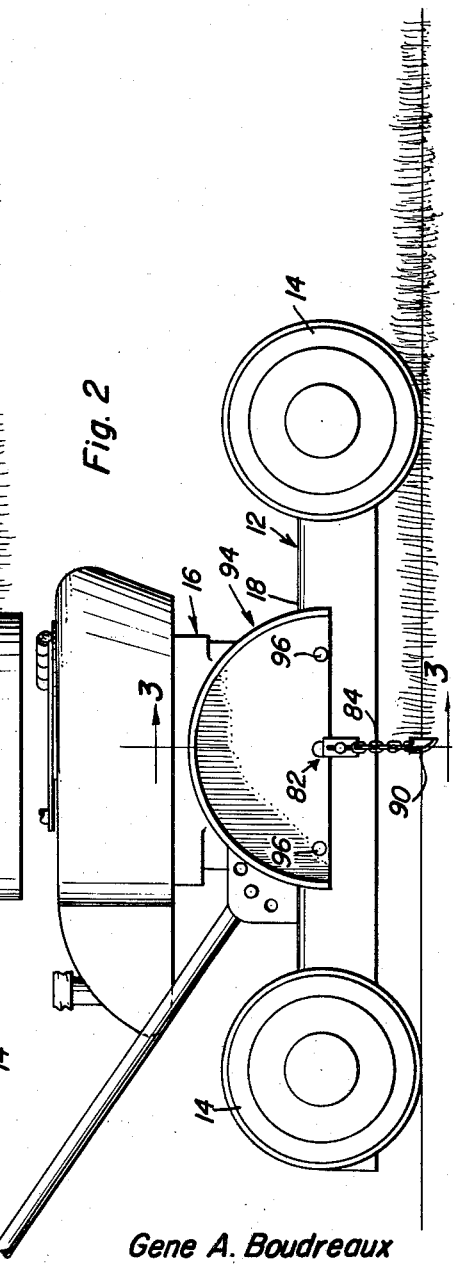
FIGURE 2 is a fragmentary side elevational view of the rotary lawn mower as illustrated in FIGURE 1.

With attention now directed to FIGURES 2 and 3 of the drawings it will be seen that the attachment includes a downwardly opening arcuate guard assembly generally referred to by the reference numeral 94 which prevents any pieces of the ground 92 from being kicked up into the face of the operator. Additionally, should any length of the elongated flexible member 84 break, the guard 94 which is secured to the flange 44 by means of fasteners 96 will prevent the disengaged end portion of the flexible member and the cutter member 90 from flying free and endangering persons or objects in the immediate area.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a rotary lawn mower of the type including a generally horizontally disposed guard platform through which a journalled upstanding drive shaft projects, a rotary cutter blade mounted on a lower portion of said drive shaft below said guard platform, an edging attachment including a power take-off shaft, an elongated journal block fixedly and dependingly supported from said platform inwardly of the outer peripheral edge portions thereof and journalling said power take-off shaft for axial displacement along and rotation about a generally horizontally disposed axis extending generally radially of the axis of rotation of said drive shaft, first and second coacting drive means carried by said drive shaft and the end portion of said power take-off shaft adjacent said drive shaft respectively for releasably drivingly connecting said driven shaft to said power take-off shaft upon axial displacement of said power take-off shaft and said first drive means relative to said journal block toward a limit position physically engaging said second drive means with said first drive means, a rotary edging member carried by the other end portion of said power take-off shaft remote from said drive shaft and disposed outwardly of the corresponding edge portion of said platform means for selectively axially shifting said power take-off shaft into and out of driving connection with said drive shaft, said corresponding edge portion of said platform including a depending flange through which the other end of said power take-off shaft projects, a rotary shifting yoke mounted on said power take-off shaft inwardly of said flange, a compression spring disposed about said take-off shaft and between the confronting surfaces of said flange and shifting yoke, said shifting means comprising a shifting fork lever engaged with said yoke at one end and pivotally secured at a point intermediate its opposite ends to said platform for movement about an axis extending generally at right angles to said power take-off shaft, and latch means carried by said platform releasably engageable with the other end of said shifting fork lever for retaining the latter in an operative position with said second drive means out of driven engagement with said first drive means.

2. The combination of claim 1 wherein said first and second coacting friction drive means comprises a first beveled wheel carried by said drive shaft and a second beveled wheel secured to said power take-off shaft respectively.

3. The combination of claim 1 wherein said rotary edging member comprises an elongated flexible member having one end secured to said other end of said power take-off shaft, a cutter member secured to the other end of said flexible member.

4. The combination of claim 3 including a downwardly opening arcuate guard carried by said edge portion of said platform and radially aligned with said one end of said flexible member.

References Cited in the file of this patent

UNITED STATES PATENTS

| | | |
|---|---|---|
| 504,934 | Mueller et al. | Sept. 12, 1893 |
| 1,095,812 | Carroll | May 5, 1914 |
| 1,099,707 | Loue | June 9, 1914 |
| 1,449,048 | Kelly | Mar. 20, 1923 |
| 2,552,583 | Phelps | May 15, 1951 |
| 2,707,858 | Norton et al. | May 10, 1955 |
| 2,718,741 | Meldahl | Sept. 27, 1955 |
| 3,053,035 | Earley | Sept. 11, 1962 |

FOREIGN PATENTS

| | | |
|---|---|---|
| 263,318 | Germany | Aug. 6, 1913 |
| 430,387 | Italy | Feb. 13, 1948 |